United States Patent
Au et al.

(10) Patent No.: US 7,212,492 B1
(45) Date of Patent: May 1, 2007

(54) TECHNIQUE FOR PROVIDING A CONTROL AND MANAGEMENT PROTOCOL FOR AN ETHERNET LAYER IN AN ETHERNET NETWORK

(75) Inventors: How Kee Au, Ottawa (CA); Kent E. Felske, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1036 days.

(21) Appl. No.: 10/152,028

(22) Filed: May 22, 2002

(51) Int. Cl.
*H04J 1/16* (2006.01)

(52) U.S. Cl. ............... 370/229; 370/235; 370/249; 370/252

(58) Field of Classification Search ........... 370/229, 370/230, 235, 236.2, 237, 241, 242, 249, 370/250, 401, 252
See application file for complete search history.

(56) References Cited

U.S. PATENT DOCUMENTS 6,847,614 B2 * 1/2005 Banker et al. ............. 370/252
6,917,763 B1 * 7/2005 Au et al. .................... 398/166
6,956,825 B2 * 10/2005 Lee et al. ................... 370/250

\* cited by examiner

*Primary Examiner*—Chi Pham
*Assistant Examiner*—Alexander O. Boakye
(74) *Attorney, Agent, or Firm*—Hunton & Williams LLP

(57) ABSTRACT

A technique for providing a control and management protocol for an Ethernet network in an Ethernet layer is disclosed. In one embodiment, the technique is realized by transporting a plurality of inter-nodal messages via Ethernet packets based on a type parameter; identifying at least one management packet from the Ethernet packets; and identifying a management function associated with the at least one management packet based on a management parameter. In addition, the management function may involve notification of physical link failure; monitoring congestion; monitoring packet errors; communicating with an External Management System; measuring signal quality of link; detecting loss of signal; assessing signal quality of nodes by a loop back packet comparison; and communicating user information in the form of voice, data, and video between nodes.

15 Claims, 11 Drawing Sheets

TECHNIQUE FOR PROVIDING A CONTROL AND MANAGEMENT PROTOCOL FOR AN ETHERNET LAYER IN AN ETHERNET NETWORK

FIELD OF THE INVENTION

The present invention relates generally to a control and management protocol and, more particularly, to a technique for providing a control and management protocol for an Ethernet layer in an Ethernet network.

BACKGROUND OF THE INVENTION

As a dominant Local Area Network (LAN) protocol, Ethernet is widely accepted and well understood. Its bandwidth evolution from Megabits per second (Mbps) to Gigabits per second (Gbps), as well as a competitive price per port, have attracted all types of service providers. Further, Ethernet can be used without a Synchronous Optical Network (SONET) protocol based network, thereby further reducing operating costs. On a business investment side, Regional Bell Operating Companies (RBOCs) have shown great interest in adopting Ethernet, and Gigabit Ethernet (GE) in particular, as a transport mechanism for voice, data and video in a network. This is economically attractive from a standpoint of operations and capital expenses.

However, there are concerns as to whether Service Level Agreements achieved by SONET can be sustained by Ethernet networks, as carriers of SONET tend to be more stringent in maintaining a high grade of service than normal IP service providers. For normal IP service, disruption of communications for a period up to tens of seconds may be tolerated by customers. However, for carriers of SONET, this period for restoration is regarded as unacceptable. In particular, link failures should be restored by a protection mechanism (e.g., a protection protocol and associated hardware) within a time period of approximately 50 milliseconds.

In a current deployment of GE services, a physical layer may include SONET or a photonic network, for example. Ethernet data frames are transported as payloads by physical layers of SONET or a photonic network. However, management of an Ethernet layer is limited and distinct from management capabilities of the physical layer of a network.

In SONET, detection of a fiber link failure between a first node and a second node is communicated via SONET overhead parameters. A protection link switch-over may be immediately initiated if a system is so configured. Generally, an Ethernet layer is oblivious of any management action taken in the physical layer.

External management of the Ethernet layer is mainly focused in a protocol domain (e.g. Management Information Base (MIB)). In particular, an External Network Management system only manages the Ethernet layer by manipulating MIB parameters at a management interface.

An Ethernet node (e.g., Ethernet switch) in a LAN network may rely on higher layer protocols to establish "keep alive" communication with peer nodes, where topology of the network may be reconfigured in case of link failure. Reconfiguration may take tens of seconds, for example. However, the Ethernet layer itself does not support any means to detect link failure or support a restoration scheme to recover from a failure situation. In current Ethernet networks, when network congestion is observed, a common approach involves enabling each Ethernet switch to discard Ethernet packets to alleviate the network congestion thereby resulting in inefficiencies.

Ethernet protocol does not currently support functions to facilitate management aspects of an Ethernet layer in a network. There is no channel dedicated to managing information exchange between nodes. If the Ethernet layer is to be utilized as a transport layer for various services, there is a need to have a set of management protocols for the Ethernet layer, similar to those of SONET, to enable the nodes (e.g., switches) of an Ethernet network to exchange management information. The introduction of these new protocols may enable the Ethernet layer to emulate management functions of a SONET network, where the management function of an Ethernet network may assume "SONET-like" characteristics.

In view of the foregoing, it would be desirable to provide a technique for providing a control and management protocol which overcomes the above-described inadequacies and shortcomings. More particularly, it would be desirable to provide a technique for providing a control and management protocol for an Ethernet layer in an Ethernet network in an efficient and cost effective manner. A management function at the Ethernet layer at each node to utilize the control and management protocol to exchange information with peer nodes to perform network management would also be desirable.

SUMMARY OF THE INVENTION

According to the present invention, a technique for providing control and management for an Ethernet network in the Ethernet layer is provided. In one exemplary embodiment, a method for providing a control and management protocol for an Ethernet network in an Ethernet layer comprises the steps of transporting a plurality of inter-nodal messages via Ethernet packets based on a type parameter; identifying at least one management packet from the Ethernet packets; and identifying a management function associated with the at least one management packet based on a management parameter.

In accordance with other aspects of this exemplary embodiment of the present invention, the management function comprises the steps identifying a physical link failure and passing information related to the physical link failure to an Ethernet management function at the Ethernet layer; the management function comprises the step of monitoring packet congestion wherein packet congestion is indicated by a buffer full condition and sending an alarm message indicating the packet congestion to an Ethernet management function at a peer node; the management function comprises the steps of counting a number of packet errors over a period of time, determining whether the number of packet errors exceeds a predetermined threshold, and sending an alarm message indicating an excess of packet errors to an Ethernet management function at a peer node, when the number of packet errors exceed the predetermined threshold; the management function comprises the steps of configuring a management information forwarding node to communicate with an External Management System and forwarding a management packet intended for the External Management System to the management information forwarding node; the management function comprises the steps of sending at least one quality measurement packet from a first node to a second node, decoding the at least one quality measurement packet at one or more of the first node and the second node and calculating signal quality of a link between the first node to the second node; the management function comprises the steps of sending at least one message from a first node to a second node, determining whether a response is received for the at least one message and determining a link failure based on a lack of responses to a predetermined number of successive messages; the management function comprises the steps of initiating a first node to send a first loop back packet to a second node, receiving a response loop back packet from the second node, and comparing the first loop back packet and the response loop back packet for assessing signal quality; and the management function comprises the step of supporting voice, data and video communications via at least one order wire.

In accordance with another aspect of this exemplary embodiment of the present invention, a computer signal embodied in a carrier wave readable by a computing system and encoding a computer program of instructions for executing a computer process performs the method recited above.

In another exemplary embodiment of the present invention, a system for supporting a control and management protocol for an Ethernet network in an Ethernet layer comprises an Ethernet switch for transporting a plurality of inter-nodal messages via Ethernet packets; a type parameter for identifying at least one management packet from the Ethernet packets; and a management parameter for identifying a management function associated with the at least one management packet.

In accordance with other aspects of this exemplary embodiment of the present invention, the management function identifies a physical link failure and passes information related to the physical link failure to an Ethernet management function at the Ethernet layer; the management function monitors packet congestion wherein packet congestion is indicated by a buffer full condition and sends an alarm message indicating the packet congestion to an Ethernet management function at a peer node; the management function counts a number of packet errors over a period of time, determines whether the number of packet errors exceeds a predetermined threshold, and sends an alarm message indicating an excess of packet errors to an Ethernet management function at a peer node, when the number of packet errors exceed the predetermined threshold; the management function configures a management information forwarding node to communicate with an External Management System and forwards a management packet intended for the External Management System to the management information forwarding node; the management function sends at least one quality measurement packet from a first node to a second node, decodes the at least one quality measurement packet at one or more of the first node and the second node, and calculates signal quality of a link between the first node to the second node; the management function sends at least one message from a first node to a second node, determines whether a response is received for the at least one message, and determines a link failure based on a lack of responses to a predetermined number of successive messages; the management function initiates a first node to send a first loop back packet to a second node, receives a response loop back packet from the second node, and compares the first loop back packet and the response loop back packet for assessing signal quality.

In another exemplary embodiment of the present invention, an article of manufacture for providing a control and management protocol for an Ethernet network in an Ethernet layer comprises at least one processor readable carrier; and instructions carried on the at least one carrier; wherein the instructions are configured to be readable from the at least one carrier by at least one processor and thereby cause the at least one processor to operate so as to: transport a plurality of inter-nodal messages via Ethernet packets; identify at least one management packet from the Ethernet packets; and identify a management function associated with the at least one management packet based on a management parameter.

In accordance with other aspects of this exemplary embodiment of the present invention, the management function comprises the steps of identifying a physical link failure and passing information related to the physical link failure to an Ethernet management function at the Ethernet layer.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

The present invention provides a control and management protocol in an Ethernet layer to enable nodes (e.g., switches) in a network (e.g., a GE network) to exchange management information. The present invention supports a set of management functions substantially equivalent to that of a SONET network. Additional management functions introduced by the present invention provide RBOCs the ability to support a traditional carrier grade of service management for customers. In particular, a set of control and management protocols of the present invention supports messaging between nodes, detecting loss of communications between nodes, monitoring congestion conditions, monitoring packet errors, communicating alarm signals, supporting voice, data and voice communications, and communicating to an external network management system.

Figure 1:
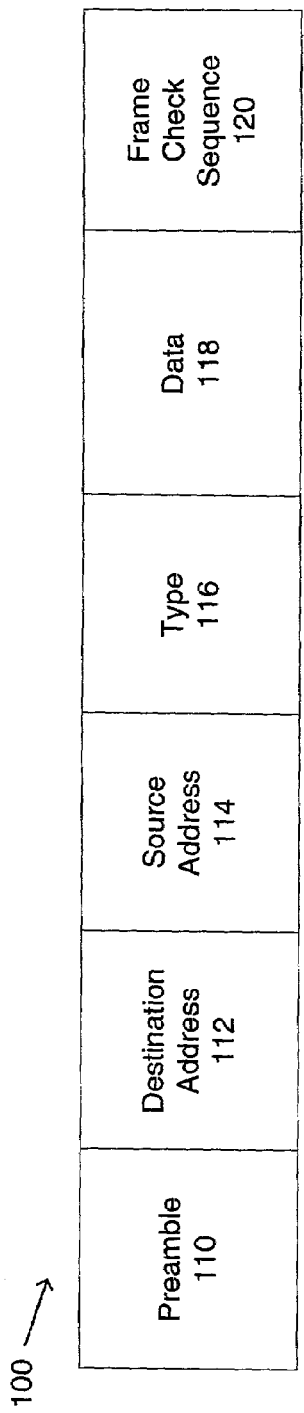
FIG. 1 is an Ethernet packet format in accordance with the present invention.

FIG. 1 is an Ethernet packet format in accordance with the present invention. Inter-nodal messages for management may be transported via Ethernet packets. As shown in FIG. 1, an Ethernet packet 100 may include a preamble 110, a destination address 112, a source address 114, a type 116, data 118 and a frame check sequence 120. A distinction between normal Ethernet data packets and control/management packets may be identified by a parameter, such as type 116, in the Ethernet packet 100. This parameter may assume a code such that an Ethernet node (e.g., an Ethernet switch) may direct the management packet to a management information processing function or an Ethernet management function at the Ethernet node. The management information processing function in each node may share the same (or substantially similar) Ethernet plane of transport for data communication with peer nodes in a network. However, processing of management data associated with the control/management packet is distinct from processing Ethernet data associated with the Ethernet data packet.

Figure 2:
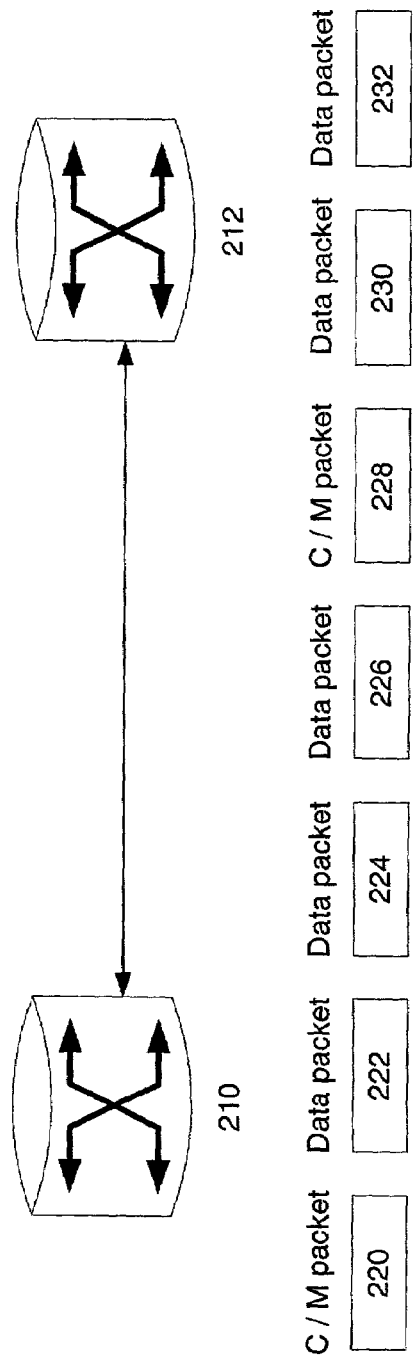
FIG. 2 is a system for supporting Ethernet package exchange in accordance with the present invention.

FIG. 2 is a system for supporting Ethernet package exchange in accordance with the present invention. Ethernet package exchange may occur between a first Ethernet switch 210 and a second Ethernet switch 212. Control/management (C/M) packets 220, 228 may be transported with Ethernet data packets 222, 224, 226, 230 and 232 between Ethernet switch 210 and Ethernet switch 212.

Figure 3:
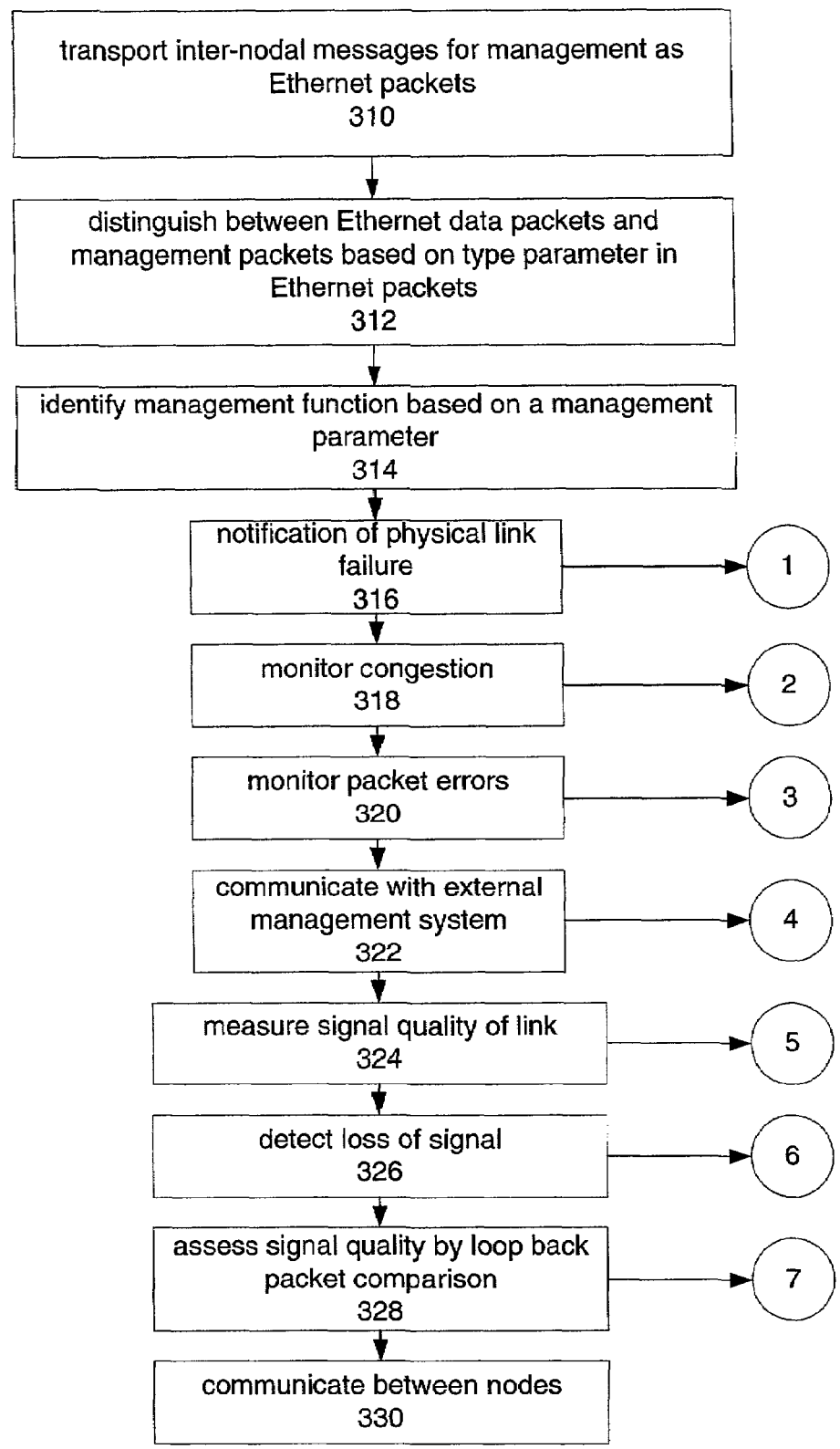
FIG. 3 is a flowchart illustrating control/management protocols in accordance with the present invention.

FIG. 3 is a flowchart illustrating a control/management protocol in accordance with the present invention. At step 310, inter-nodal messages for management may be transported as Ethernet packets. At step 312, control/management packets may be distinguished from Ethernet data packets based on a type parameter in the Ethernet packets. At step 314, a management function may be identified based on a management parameter within the control/management packet. The management functions, which may be inter-nodal management functions, may include notification of physical link failure 316; monitoring congestion 318; monitoring packet errors 320; communicating with an External Management System 322; measuring signal quality of link 326; detecting loss of signal 324; assessing signal quality of nodes by a loop back packet comparison 330; and communicating user information in the form of voice, data, and video between nodes 330.

Figure 4:
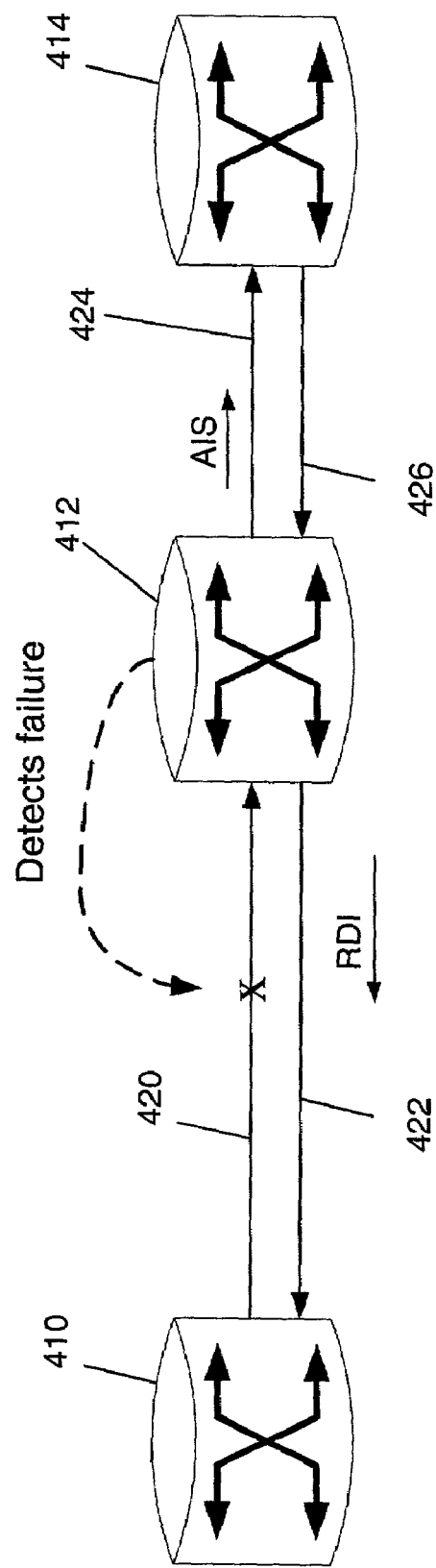
FIG. 4 is a system for forwarding control/management information in accordance with the present invention.

FIG. 4 is a system for forwarding control and management information downstream or upstream in accordance with the present invention. The system provides Ethernet switch 410 in communication with Ethernet switch 412 via link 420 and link 422. The system also provides Ethernet switch 412 in communication with Ethernet switch 414 via link 424 and link 426. The present invention supports control and management information communication, which may include transmitting an alarm indication signal (AIS) and a remote defect indication (RDI) signal, for example. As shown in FIG. 4, a failure on link 420 may be detected by Ethernet switch 412. Ethernet switch 412 may send an AIS to Ethernet switch 414 via link 424. In addition, Ethernet switch 412 may send a RDI signal to Ethernet switch 410 via link 422. Reasons for alarm indication may be embedded in the respective signals. In addition, a link protection mechanism may be activated to address (or compensate for) the detected failure at link 420.

Figure 5:
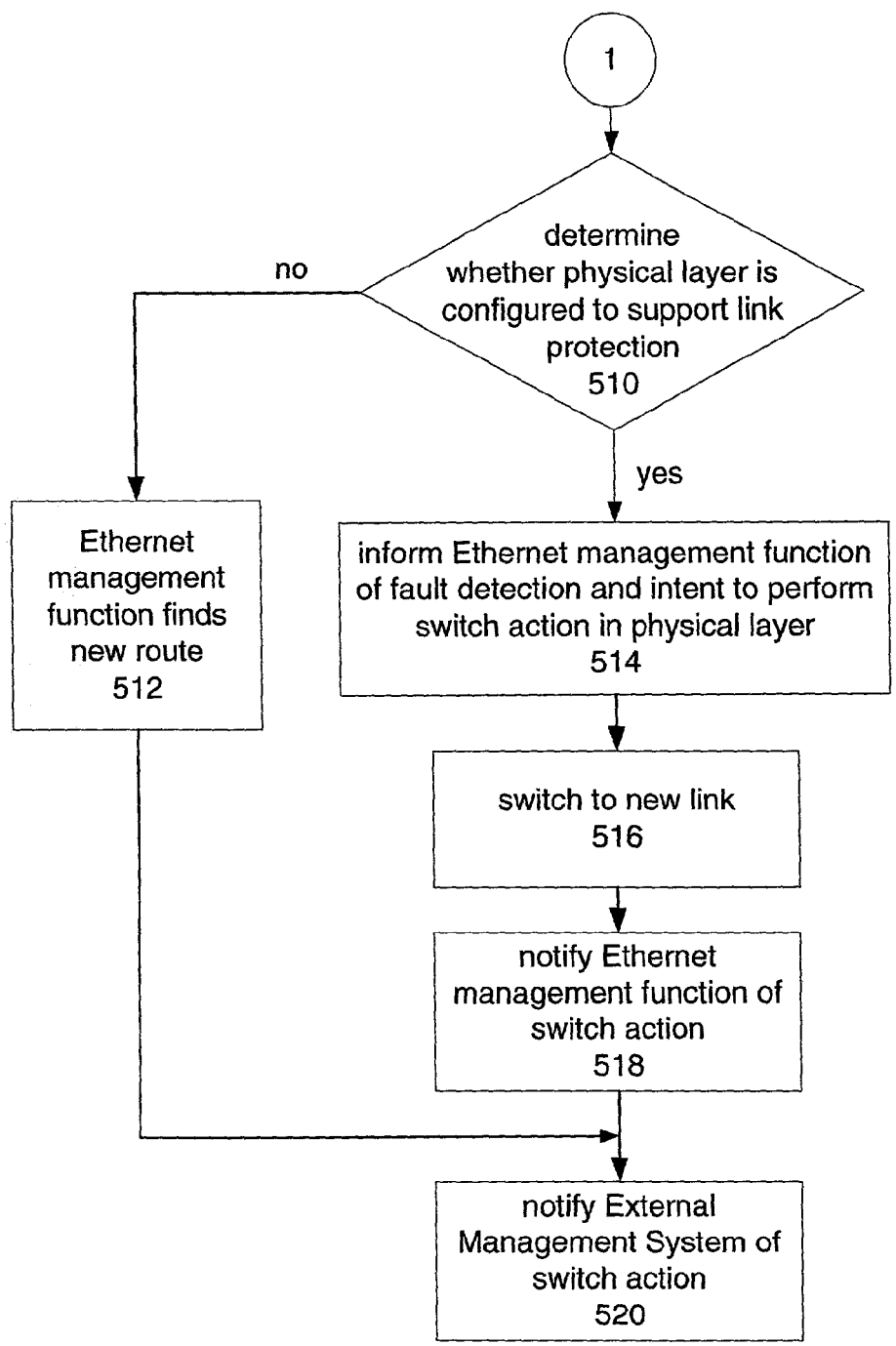
FIG. 5 is a flowchart for detecting physical link failure in accordance with the present invention.

FIG. 5 is a flowchart for identifying a physical link failure in accordance with the present invention. A physical layer may be equipped with a link failure detection. Information concerning the link failure detection may be conveyed to an Ethernet layer, following the principles of SONET where physical layer management information is passed from a Section Layer to a Line Layer and a Path Layer and so on. Whether the physical layer is configured or designed to support link protection is determined at step 510. If not, an Ethernet management function at an Ethernet layer takes immediate action to find a new route in a protection link as configured, at step 512. If the physical layer supports link protection, the Ethernet management function at the Ethernet layer may be informed of a fault detection and/or an intent to perform a switch action, at step 514. At step 516, a switch to a new link may be performed. For example, a switch to a new link may be implemented within a period of time, e.g., approximately 50 milliseconds. While it is not necessary to inform the Ethernet management function at the Ethernet layer to take protective action, the Ethernet management function may be informed of the switch action taken in the physical layer, at step 518. At step 520, the link protection action may be reported to the External Management System.

Figure 6:
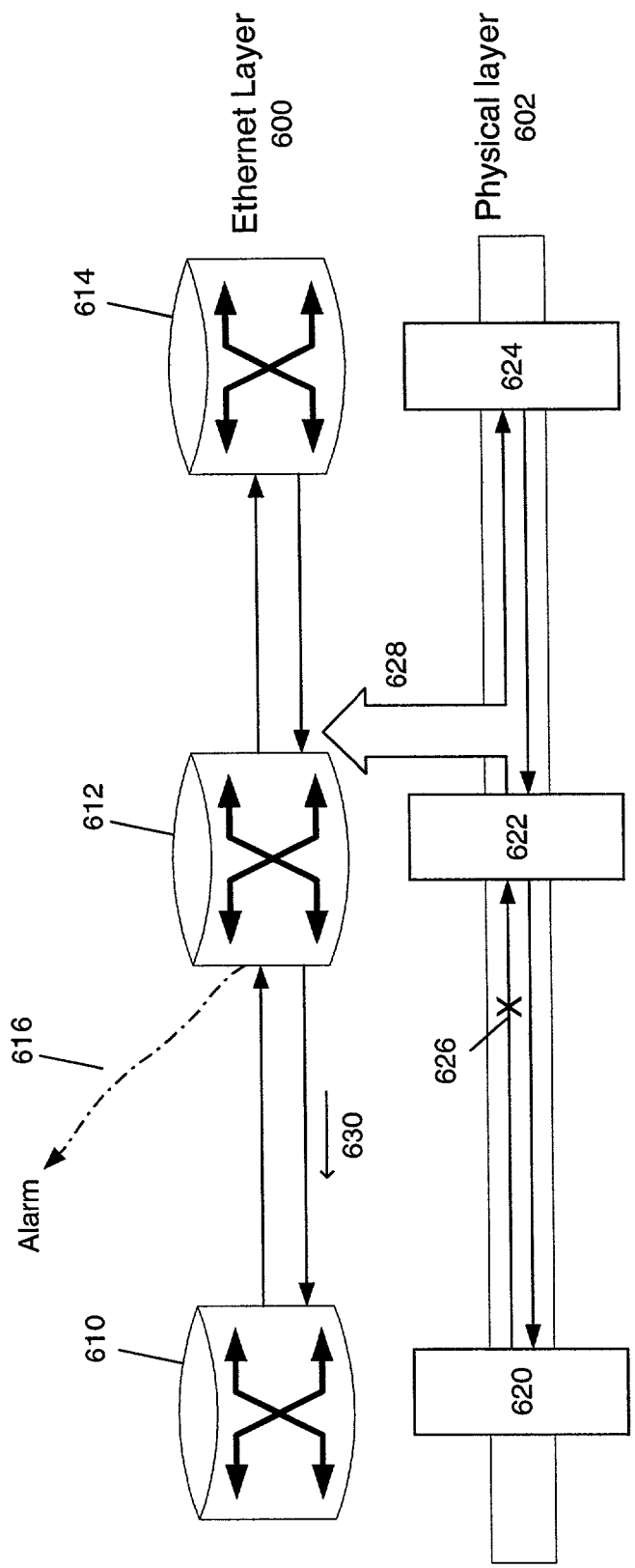
FIG. 6 is a system for exchange in physical layer failure condition with an Ethernet management function at an Ethernet layer in accordance with the present invention.

FIG. 6 is a system for physical layer failure condition exchange in accordance with the present invention. The present invention supports an "alarm" message that may be used for communicating information related to a physical layer failure condition. A physical layer 602 may support optical nodes 620, 622, and 624 connected by optical fiber links. In physical layer 602, a failure may be detected in an optical fiber link 626 where information related to the failure may be detected by optical node 622 and transmitted to Ethernet layer 600, as shown by 628. Ethernet layer 600 may support Ethernet switches 610, 612 and 614. Ethernet switch 612 may send a physical layer failure alarm 630 upstream to Ethernet switch 610. In addition to the physical layer failure alarm 630, a protection protocol may be activated at the Ethernet layer 600 to compensate for the physical layer failure. In addition, an alarm notification of the physical layer failure may be sent to an External Management System, as shown by 616.

Figure 7:
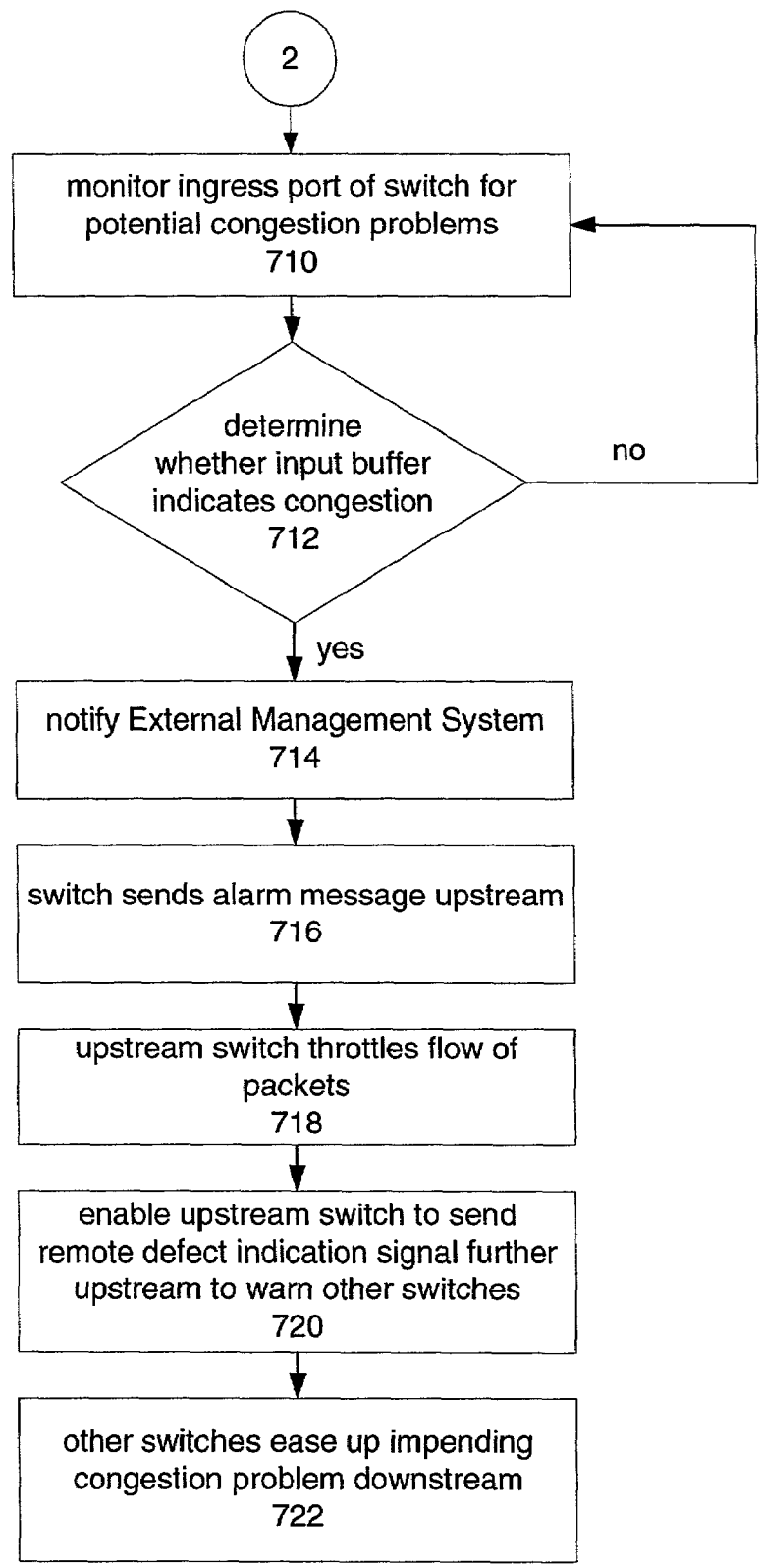
FIG. 7 is a flowchart for monitoring congestion in accordance with the present invention.

FIG. 7 is a flowchart for monitoring congestion in accordance with the present invention. At step 710, an Ethernet switch may be monitored to detect potential congestion problems. At step 712, determine whether an input buffer of the Ethernet switch is approaching a predetermined level indicating congestion. At step 714, the Ethernet switch may notify an External Management System of the congestion. At step 716, the Ethernet switch may send an alarm message upstream to warn an upstream Ethernet switch of the congestion. At step 718, the upstream Ethernet switch may throttle the flow of packets to alleviate the congestion in response to the alarm message. For example, this may be complementary to a function supported by the IEEE 802.3× protocol. In addition, the External Management System may be notified of receipt of the alarm message. At step 720, the upstream Ethernet switch may send a RDI signal further upstream to warn other upstream Ethernet switches of the congestion. The receipt of the RDI signal may also be reported to the External Management System. At step 722, the other upstream Ethernet switches may be advised to ease up on the flow of packets thereby further alleviating the congestion problem downstream.

Figure 8:
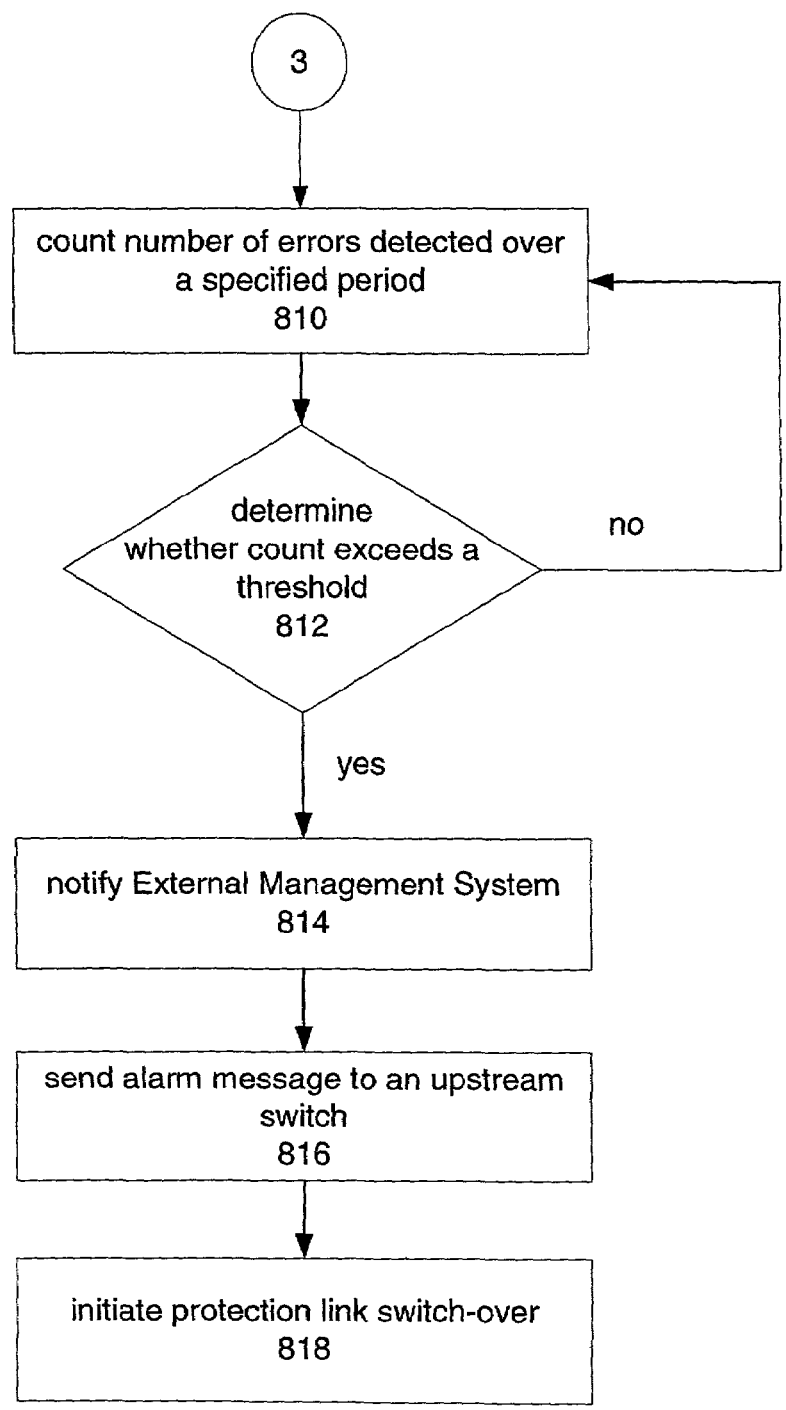
FIG. 8 is a flowchart for monitoring packet error in accordance with the present invention.

FIG. 8 is a flowchart for monitoring packet errors in accordance with the present invention. An Ethernet packet may support a Frame Check Sequence field which contains a cyclic redundancy check value created by a first Ethernet switch (e.g., a sending switch). The Frame Check Sequence field may be recalculated by a second Ethernet switch (e.g., a receiving switch) to check for damaged frames and other failure conditions. At step 810, a management function of the Ethernet layer counts the number of errors detected over a specified period. If the count exceeds a threshold as determined at step 812, an alarm message may be sent to an External Management System, at step 814. At step 816, an alarm message may be sent to an upstream switch. At step 818, a link protection mechanism may be implemented, if the link is configured to support a protection link switch-over. In addition, the External Management System may be notified of the switch-over action.

Figure 9:
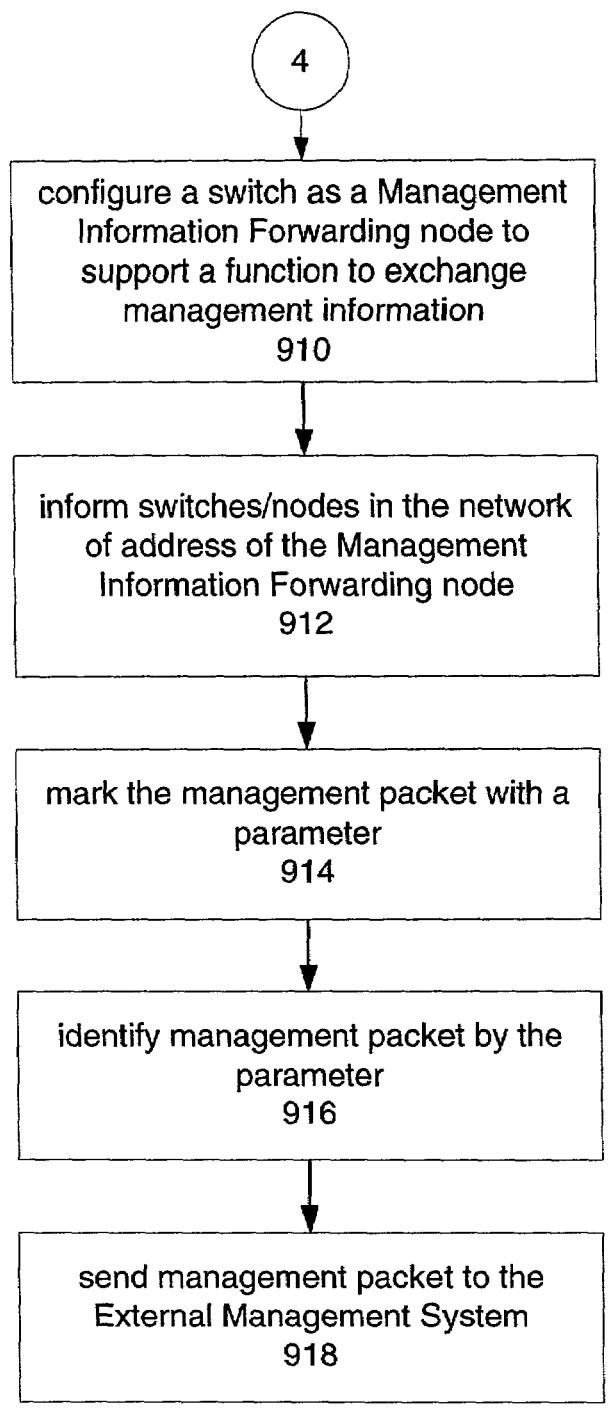
FIG. 9 is a flowchart for exchanging information with an external network management system in accordance with the present invention.

FIG. 9 is a flowchart for communicating with an External Management System in accordance with the present invention. Each Ethernet switch detecting an alarm condition may send an alarm message to an External Management System. At step 910, a switch known as a Management Information Forwarding node may be configured to support a function to exchange management information between the External Management System and any switch within a network. At step 912, at the time of system configuration, an address of the Management Information Forwarding node may be made known to other switches (or nodes) in the network. At step 914, a management packet intended for the External Management System may be marked with a parameter. At step 916, the management packet may be identified by the parameter. At step 918, the Management Information Forwarding node sends the management packet will be forwarded to the External Management System.

Figure 10:
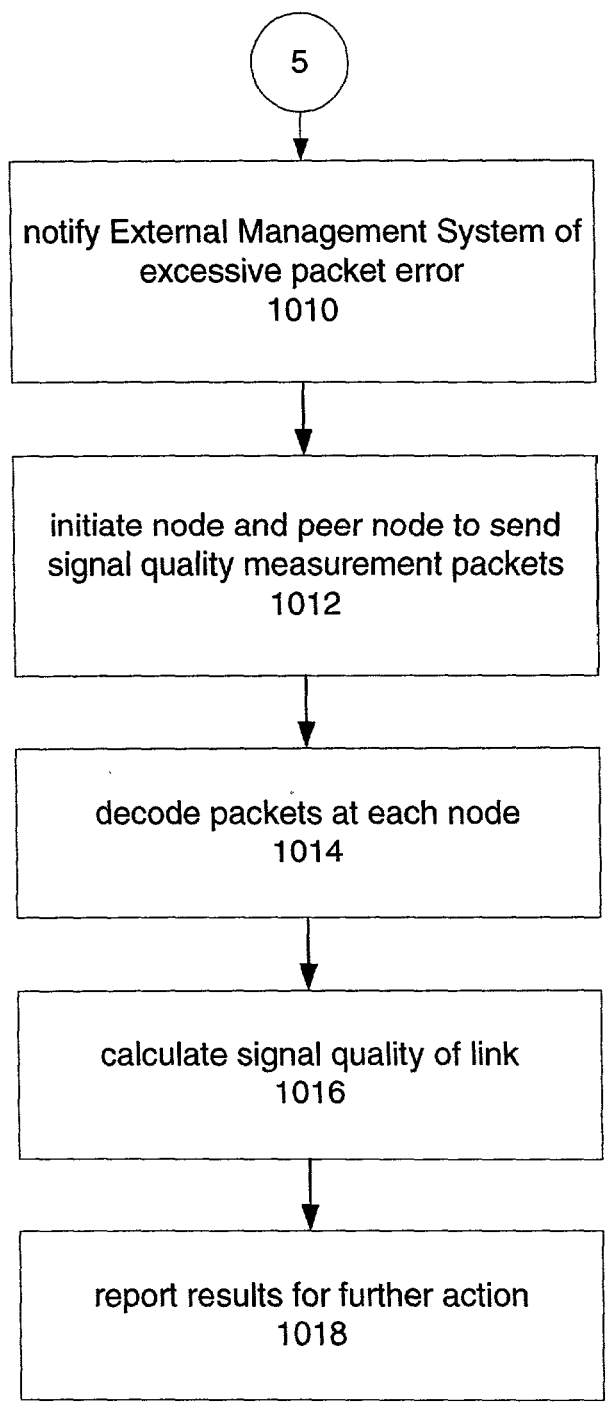
FIG. 10 is a flowchart for signal quality measurement of a link in accordance with the present invention.

FIG. 10 is a flowchart for signal quality measurement for a link in accordance with the present invention. Measurement of signal quality of a link may be initiated at any time by a user (e.g., a craft person). For example shown, a node (e.g., Ethernet switch) may detect excessive packet error (or other error) in a link. A threshold crossing message (or other message) may be sent to an External Management System, at step 1010. At step 1012, the user may instruct the node and a peer node connected to the link to send signal quality measurement packets to each other. At step 1014, each node may process (e.g., decode) the received signal quality measurement packets. At step 1016, signal quality of the link may be calculated. For example, signal quality may be determined by assessing the ratio of the bits in error and the total bits received. At step 1018, signal quality measurement results may be sent to the user for further action, if so desired.

Figure 11:
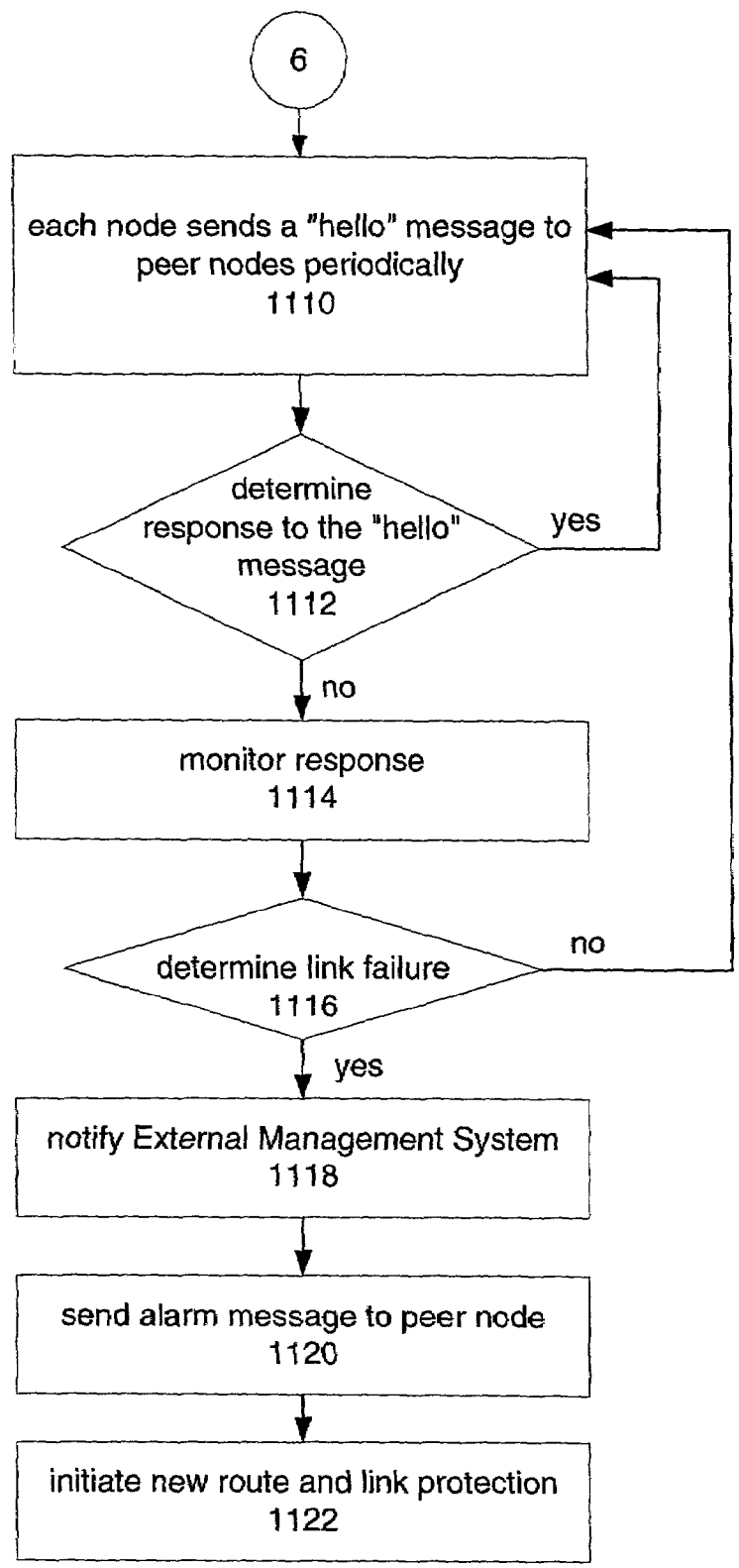
FIG. 11 is a flowchart for detecting loss of signal in a link in accordance with the present invention.

FIG. 11 is a flowchart for detecting loss of signal in a link in accordance with the present invention. At step 1100, each node may send a "hello" message to its peers periodically. The period may have a duration of 1 to 5 milliseconds, for example. At step 1112, a determination of whether a response is received to each "hello" message may be performed. If a response is not received, the node may monitor a predetermined number (e.g., 3) successive responses to its "hello" messages, for example. If the node fails to receive the predetermined number (e.g., 3) successive responses, a link failure due to a loss of signal may be determined at step 1116. At step 1118, an External Management System may be notified of the link failure. At step 1120, an alarm message may be sent to a peer node. In addition, a new route or switch to a protecting link, if such a link is configured, may be initiated at step 1122.

Figure 12:
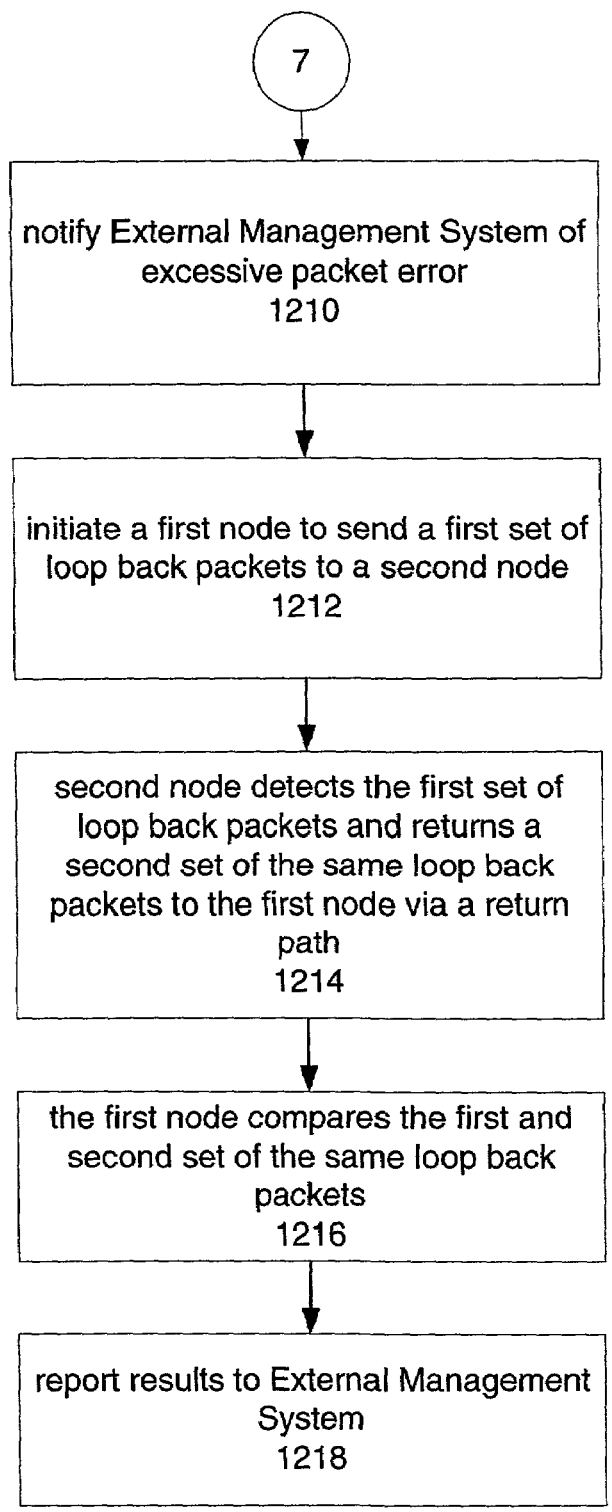
FIG. 12 is a flowchart for a signal loop back process in accordance with the present invention.

FIG. 12 is a flowchart for sending loop back packets in a link in accordance with the present invention. Sending loop back packets in a link may be initiated at any time by a user (e.g., a craft person). For example, a first node may detect excessive packet errors (or other error) from a second node in a link. At step 1210, a threshold crossing message (or other message) may be sent to an External Management System. At step 1212, a first node may be initiated by the user to send a first set of loop back packets to a second node connected to the link. The packets may be encoded, for example. At step 1214, the second node may detect the first set of loop back packets and return a second set of the same loop back packets to the first node via a return path. At step 1216, the first node may compare the first and second set of the same loop back packets for assessing signal quality and other characteristics. For example, assessment of signal quality may include comparing Framing Check Sequences of the packets. At step 1218, the result of the comparison may be reported to the External Management System for further action, if so desired.

In carrier networks, nodes may be linked by a dedicated communication channel to facilitate voice communication between users at these nodes, while they are performing network maintenance activities. This communication channel may be known as an order wire. Special Ethernet packets may be supported by the protocol of the present invention to support voice, as well as data and video communications.

At this point it should be noted that a control and management protocol in accordance with the present invention as described above typically involves the processing of input data and the generation of output data to some extent. This input data processing and output data generation may be implemented in hardware or software. For example, specific electronic components may be employed in a switch or similar or related circuitry for implementing the functions associated with a control and management protocol in accordance with the present invention as described above. Alternatively, one or more processors operating in accordance with stored instructions may implement the functions associated a control and management protocol in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for providing a control and management protocol for an Ethernet network in an Ethernet layer, the method comprising the steps of:

transporting a plurality of inter-nodal messages via Ethernet packets based on a type parameter;

identifying at least one management packet from the Ethernet packets;

identifying a management function associated with the at least one management packet based on a management parameter;

identifying a physical link failure; and passing information related to the physical link failure to an Ethernet management function at the Ethernet layer.

2. A method for providing a control and management protocol for an Ethernet network in an Ethernet layer, the method comprising the steps of:

transporting a plurality of inter-nodal messages via Ethernet packets based on a type parameter;

identifying at least one management packet from the Ethernet packets;

identifying a management function associated with the at least one management packet based on a management parameter;

monitoring packet congestion wherein packet congestion is indicated by a buffer full condition; and sending an alarm message indicating the packet congestion to an Ethernet management function at a peer node.

3. A method for providing a control and management protocol for an Ethernet network in an Ethernet layer, the method comprising the steps of:

transporting a plurality of inter-nodal messages via Ethernet packets based on a type parameter;

identifying at least one management packet from the Ethernet packets;

identifying a management function associated with the at least one management packet based on a management parameter;

counting a number of packet errors over a period of time;

determining whether the number of packet errors exceeds a predetermined threshold; and sending an alarm message indicating an excess of packet errors to an Ethernet management function at a peer node, when the number of packet errors exceed the predetermined threshold.

4. A method for providing a control and management protocol for an Ethernet network in an Ethernet layer, the method comprising the steps of:

transporting a plurality of inter-nodal messages via Ethernet packets based on a type parameter;

identifying at least one management packet from the Ethernet packets;

identifying a management function associated with the at least one management packet based on a management parameter;

configuring a management information forwarding node to communicate with an External Management System; and forwarding a management packet intended for the External Management System to the management information forwarding node.

5. A method for providing a control and management protocol for an Ethernet network in an Ethernet layer, the method comprising the steps of:

transporting a plurality of inter-nodal messages via Ethernet packets based on a type parameter;

identifying at least one management packet from the Ethernet packets;

identifying a management function associated with the at least one management packet based on a management parameter;

sending at least one quality measurement packet from a first node to a second node;

decoding the at least one quality measurement packet at one or more of the first node and the second node; and calculating signal quality of a link between the first node to the second node.

6. A method for providing a control and management protocol for an Ethernet network in an Ethernet layer, the method comprising the steps of:

transporting a plurality of inter-nodal messages via Ethernet packets based on a type parameter;

identifying at least one management packet from the Ethernet packets;

identifying a management function associated with the at least one management packet based on a management parameter;

sending at least one message from a first node to a second node;

determining whether a response is received for the at least one message; and determining a link failure based on a lack of responses to a predetermined number of successive messages.

7. A method for providing a control and management protocol for an Ethernet network in an Ethernet layer, the method comprising the steps of:

transporting a plurality of inter-nodal messages via Ethernet packets based on a type parameter;

identifying at least one management packet from the Ethernet packets;

identifying a management function associated with the at least one management packet based on a management parameter;

initiating a first node to send a first loop back packet to a second node;

receiving a response loop back packet from the second node; and comparing the first loop back packet and the response loop back packet for assessing signal quality.

8. A system for supporting a control and management protocol for an Ethernet network in an Ethernet layer, the system comprising:

an Ethernet switch for transporting a plurality of inter-nodal messages via Ethernet packets;

a type parameter for identifying at least one management packet from the Ethernet packets; and a management parameter for identifying a management function associated with the at least one management packet; wherein the management function identifies a physical link failure and passes information related to the physical link failure to an Ethernet management function at the Ethernet layer.

9. A system for supporting a control and management protocol for an Ethernet network in an Ethernet layer, the system comprising:

an Ethernet switch for transporting a plurality of inter-nodal messages via Ethernet packets;

a type parameter for identifying at least one management packet from the Ethernet packets; and a management parameter for identifying a management function associated with the at least one management packet; wherein the management function monitors packet congestion wherein packet congestion is indicated by a buffer full condition and sends an alarm message indicating the packet congestion to an Ethernet management function at a peer node.

10. A system for supporting a control and management protocol for an Ethernet network in an Ethernet layer, the system comprising:

an Ethernet switch for transporting a plurality of inter-nodal messages via Ethernet packets;

a type parameter for identifying at least one management packet from the Ethernet packets; and a management parameter for identifying a management function associated with the at least one management packet; wherein the management function counts a number of packet errors over a period of time; determines whether the number of packet errors exceeds a predetermined threshold; and sends an alarm message indicating an excess of packet errors to an Ethernet management function at a peer node, when the number of packet errors exceed the predetermined threshold.

11. A system for supporting a control and management protocol for an Ethernet network in an Ethernet layer, the system comprising:

an Ethernet switch for transporting a plurality of inter-nodal messages via Ethernet packets;

a type parameter for identifying at least one management packet from the Ethernet packets; and a management parameter for identifying a management function associated with the at least one management packet; wherein the management function configures a management information forwarding node to communicate with an External Management System and forwards a management packet intended for the External Management System to the management information forwarding node.

12. A system for supporting a control and management protocol for an Ethernet network in an Ethernet layer, the system comprising:

an Ethernet switch for transporting a plurality of inter-nodal messages via Ethernet packets;

a type parameter for identifying at least one management packet from the Ethernet packets; and a management parameter for identifying a management function associated with the at least one management packet; wherein the management function sends at least one quality measurement packet from a first node to a second node; decodes the at least one quality measurement packet at one or more of the first node and the second node; and calculates signal quality of a link between the first node to the second node.

13. A system for supporting a control and management protocol for an Ethernet network in an Ethernet layer, the system comprising:

an Ethernet switch for transporting a plurality of inter-nodal messages via Ethernet packets;

a type parameter for identifying at least one management packet from the Ethernet packets; and a management parameter for identifying a management function associated with the at least one management packet; wherein the management function sends at least one message from a first node to a second node; determines whether a response is received for the at least one message; and determines a link failure based on a lack of responses to a predetermined number of successive messages.

14. A system for supporting a control and management protocol for an Ethernet network in an Ethernet layer, the system comprising:

an Ethernet switch for transporting a plurality of inter-nodal messages via Ethernet packets;

a type parameter for identifying at least one management packet from the Ethernet packets; and a management parameter for identifying a management function associated with the at least one management packet; wherein the management function initiates a first node to send a first loop back packet to a second node; receives a response loop back packet from the second node; and compares the first loop back packet and the response loop back packet for assessing signal quality.

15. An article of manufacture for providing a control and management protocol for an Ethernet network in an Ethernet layer, the article of manufacture comprising:

at least one processor readable carrier; and instructions carried on the at least one carrier;

wherein the instructions are configured to be readable from the at least one carrier by at least one processor and thereby cause the at least one processor to operate so as to:

transport a plurality of inter-nodal messages via Ethernet packets;

identify at least one management packet from the Ethernet packets;

identify a management function associated with the at least one management packet based on a management parameter;

identify a physical link failure; and pass information related to the physical link failure to an Ethernet management function at an Ethernet management function at the Ethernet layer.

* * * * *